(12) United States Patent
Lee

(10) Patent No.: US 11,231,013 B2
(45) Date of Patent: Jan. 25, 2022

(54) ROTATIONAL MOVEMENT ASSISTING DEVICE

(71) Applicant: Chu Won Lee, Gyeonggi-do (KR)

(72) Inventor: Chu Won Lee, Gyeonggi-do (KR)

(*) Notice: Subject to any disclaimer, the term of this patent is extended or adjusted under 35 U.S.C. 154(b) by 158 days.

(21) Appl. No.: 16/639,691

(22) PCT Filed: Aug. 3, 2018

(86) PCT No.: PCT/KR2018/008819
§ 371 (c)(1),
(2) Date: Feb. 17, 2020

(87) PCT Pub. No.: WO2019/035583
PCT Pub. Date: Feb. 21, 2019

(65) Prior Publication Data
US 2021/0010459 A1   Jan. 14, 2021

(30) Foreign Application Priority Data
Aug. 17, 2017   (KR) ........................ 10-2017-0104322

(51) Int. Cl.
*F03D 9/12* (2016.01)
*F03D 9/14* (2016.01)
*F03D 3/00* (2006.01)

(52) U.S. Cl.
CPC .............. *F03D 9/12* (2016.05); *F03D 3/005* (2013.01); *F03D 9/14* (2016.05); *F05B 2220/30* (2013.01); *F05B 2260/421* (2013.01); *F05B 2260/422* (2020.08)

(58) Field of Classification Search
CPC ... F03D 9/12; F03D 9/14; F03D 3/005; F05B 2260/422; F05B 2220/30; F05B 2260/421
See application file for complete search history.

(56) References Cited

U.S. PATENT DOCUMENTS

2017/0306927 A1* 10/2017 Vallejo ................... F03D 80/88

FOREIGN PATENT DOCUMENTS

KR   20150021333   3/2015

* cited by examiner

*Primary Examiner* — Viet P Nguyen
(74) *Attorney, Agent, or Firm* — IPLA P.A.; James E. Bame

(57) ABSTRACT

A rotational movement assisting device includes: a pipe-type rotary shaft having a through-hole formed therein; a rotational blade coupled so as to rotate the rotary shaft by using a rotation coupling unit provided on an uppermost end of the rotary shaft; a base unit erectly provided by using a rotation installation unit such that the rotary shaft is rotatable; a dual partition wall-type reservoir unit provided at the rotary shaft between the rotational blade and the base unit so as to be coupled to be rotatable; a multistage expandable horizontal rotation unit communicating with the reservoir unit such that circulating water may be introduced thereinto, and having an inner space part formed therein; a power generator provided on an upper surface of the base unit.

8 Claims, 6 Drawing Sheets

[Fig. 1]
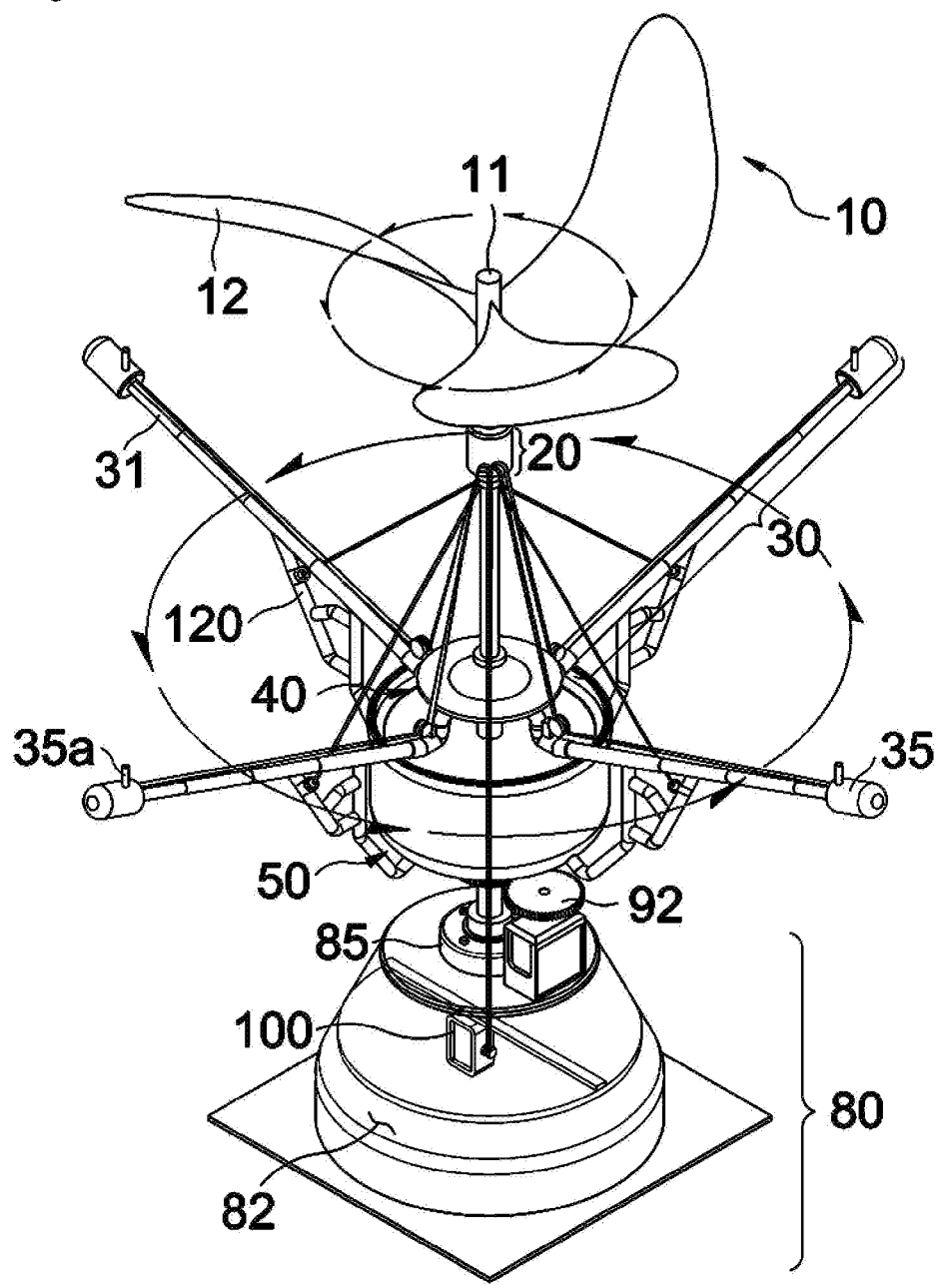

[Fig. 2]
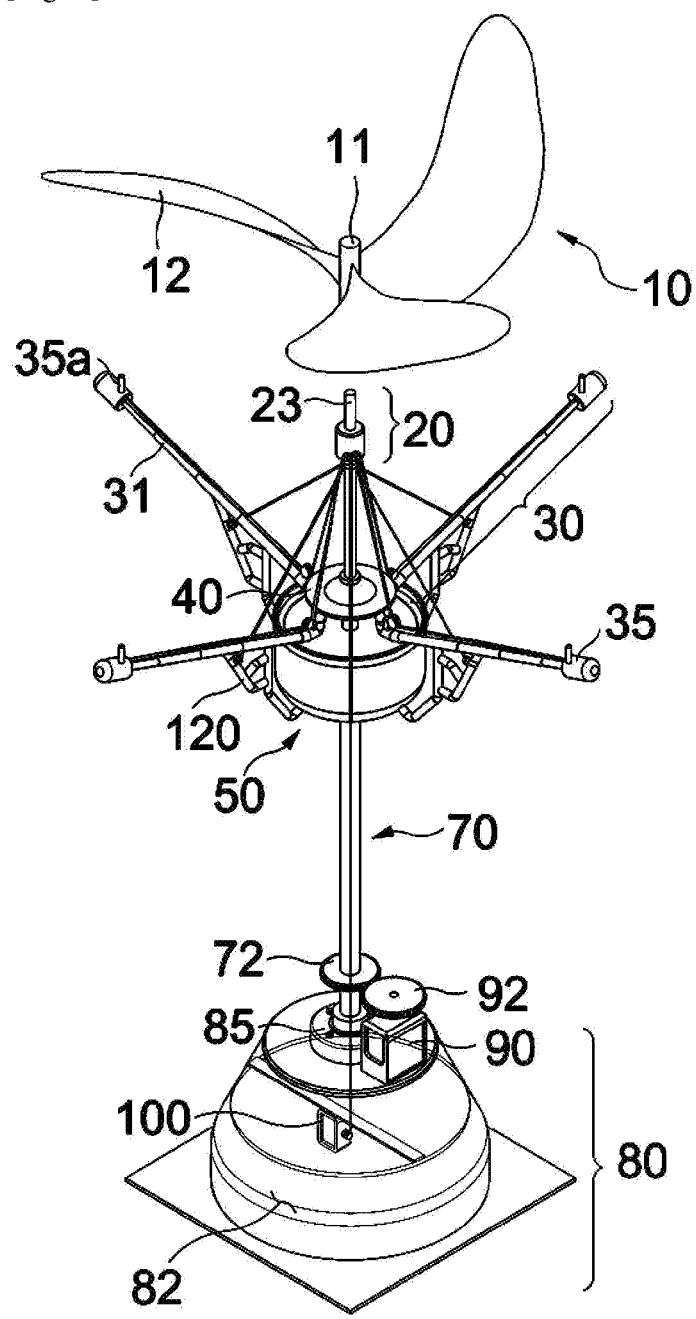

[Fig. 3]
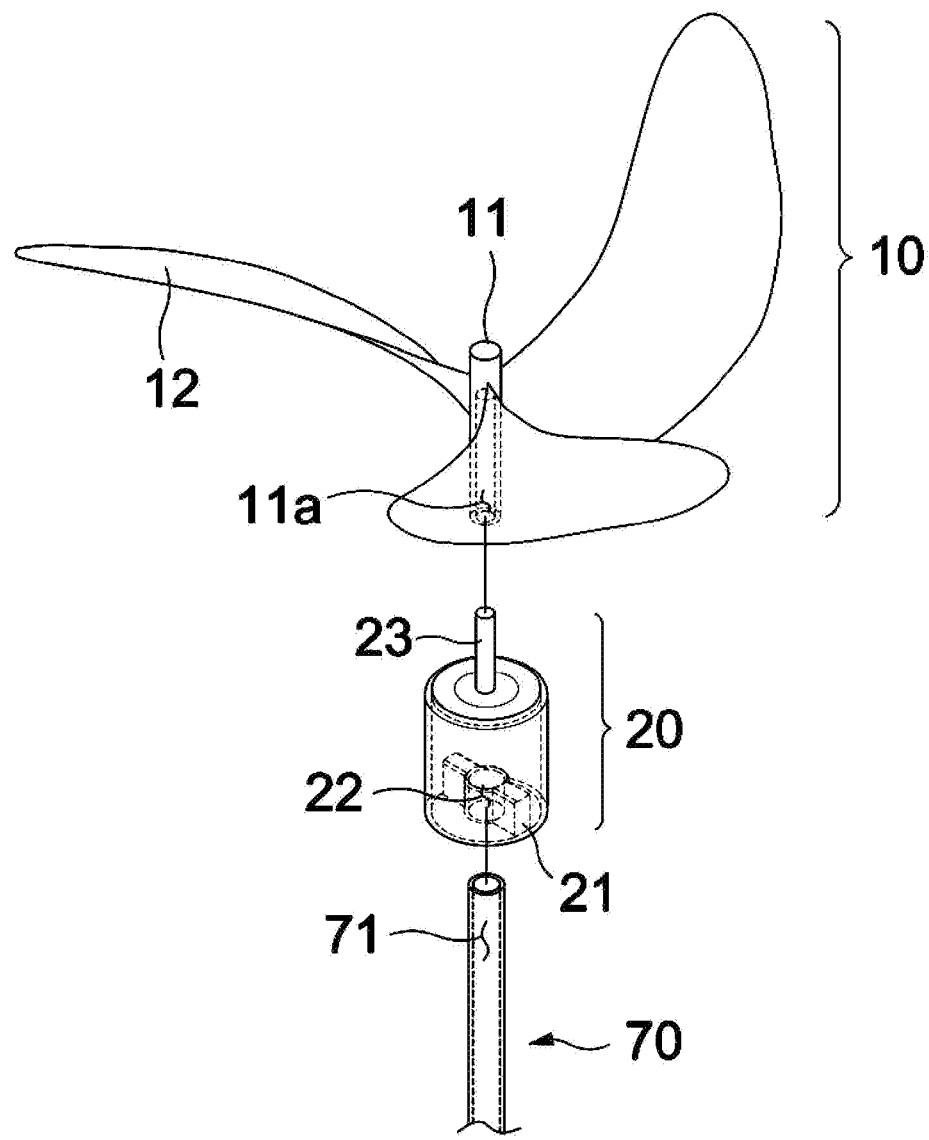

[Fig. 4]
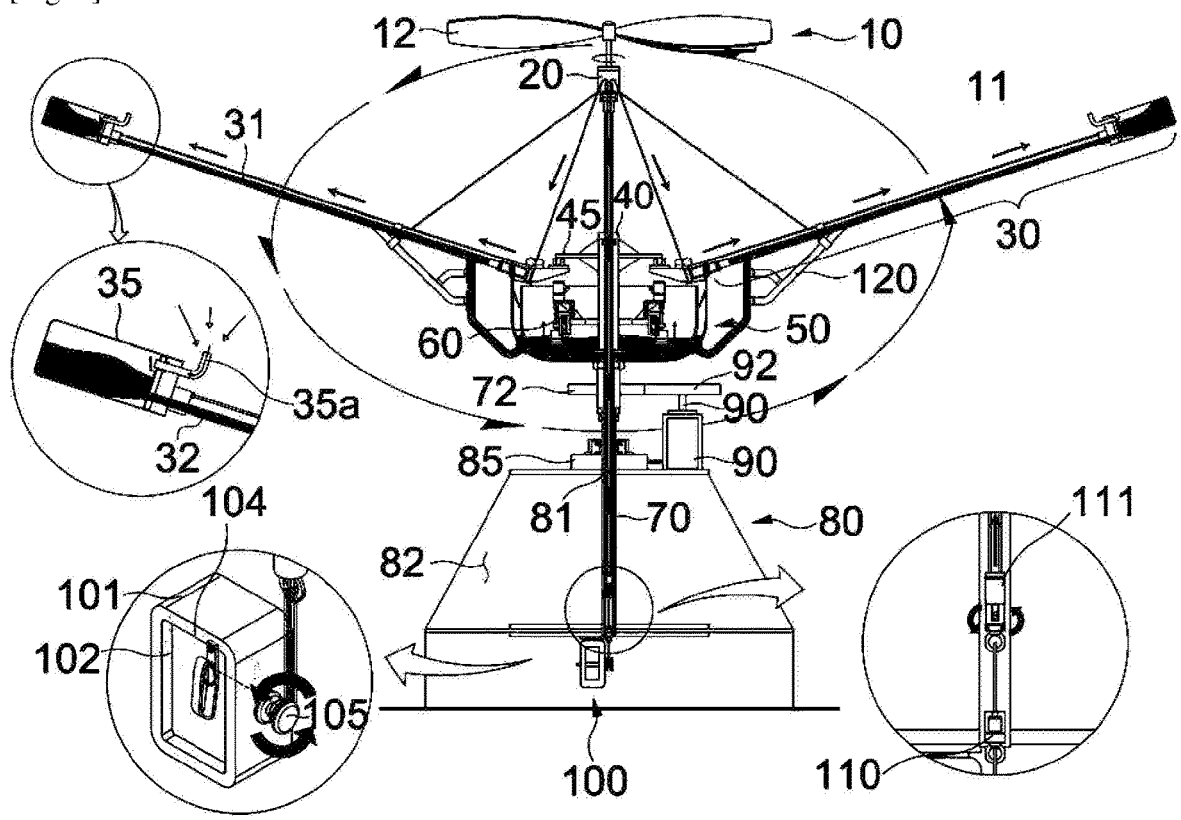
[Fig. 5]
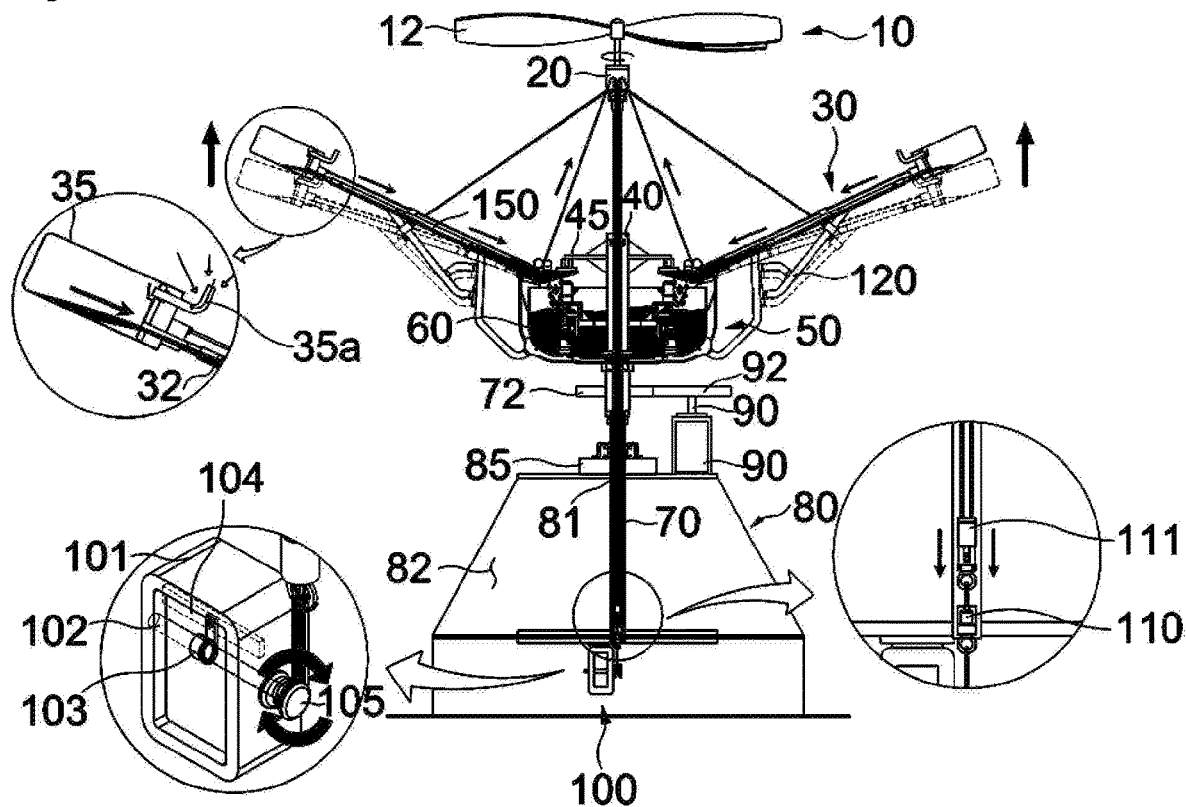

[Fig. 6]
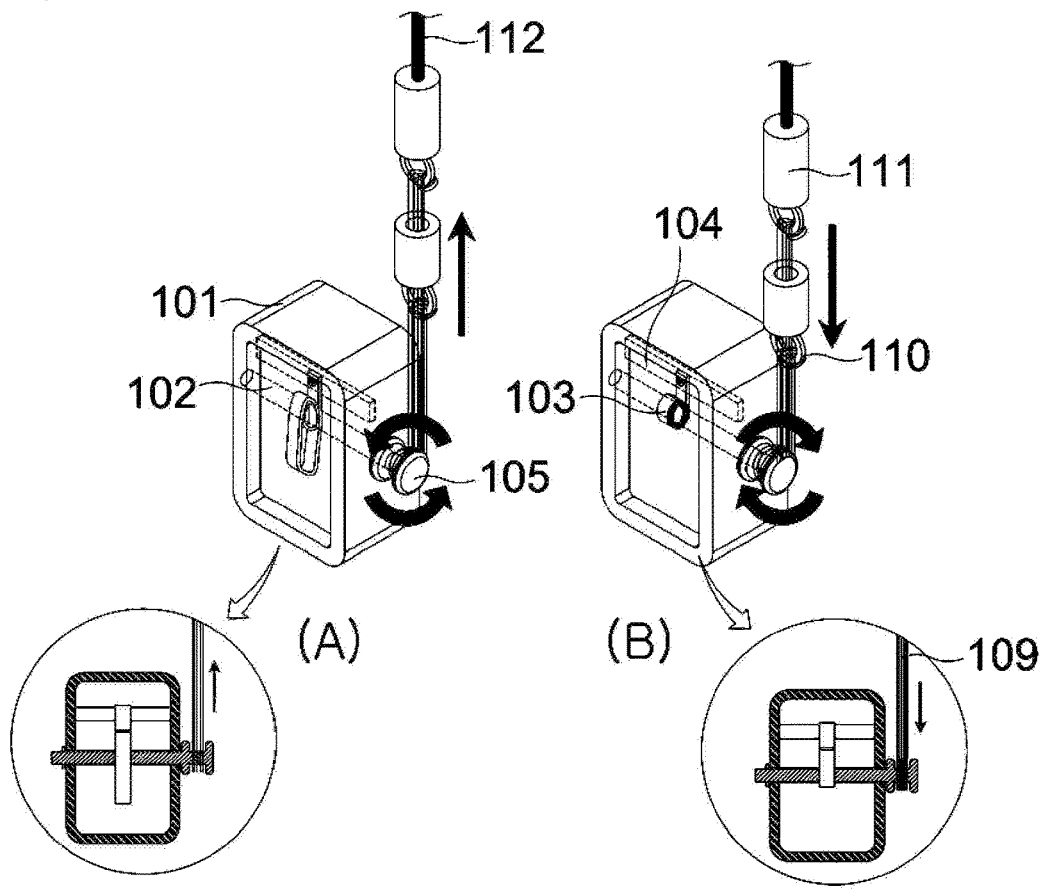
[Fig. 7]
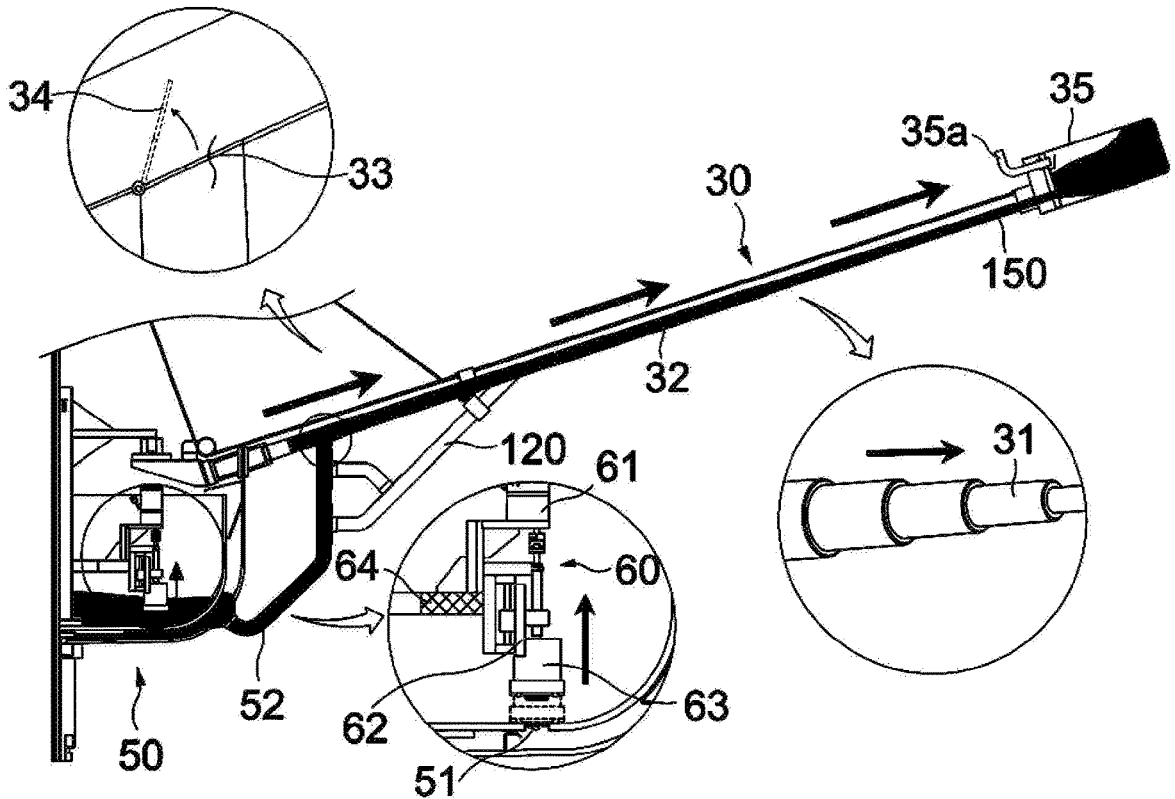

[Fig. 8]
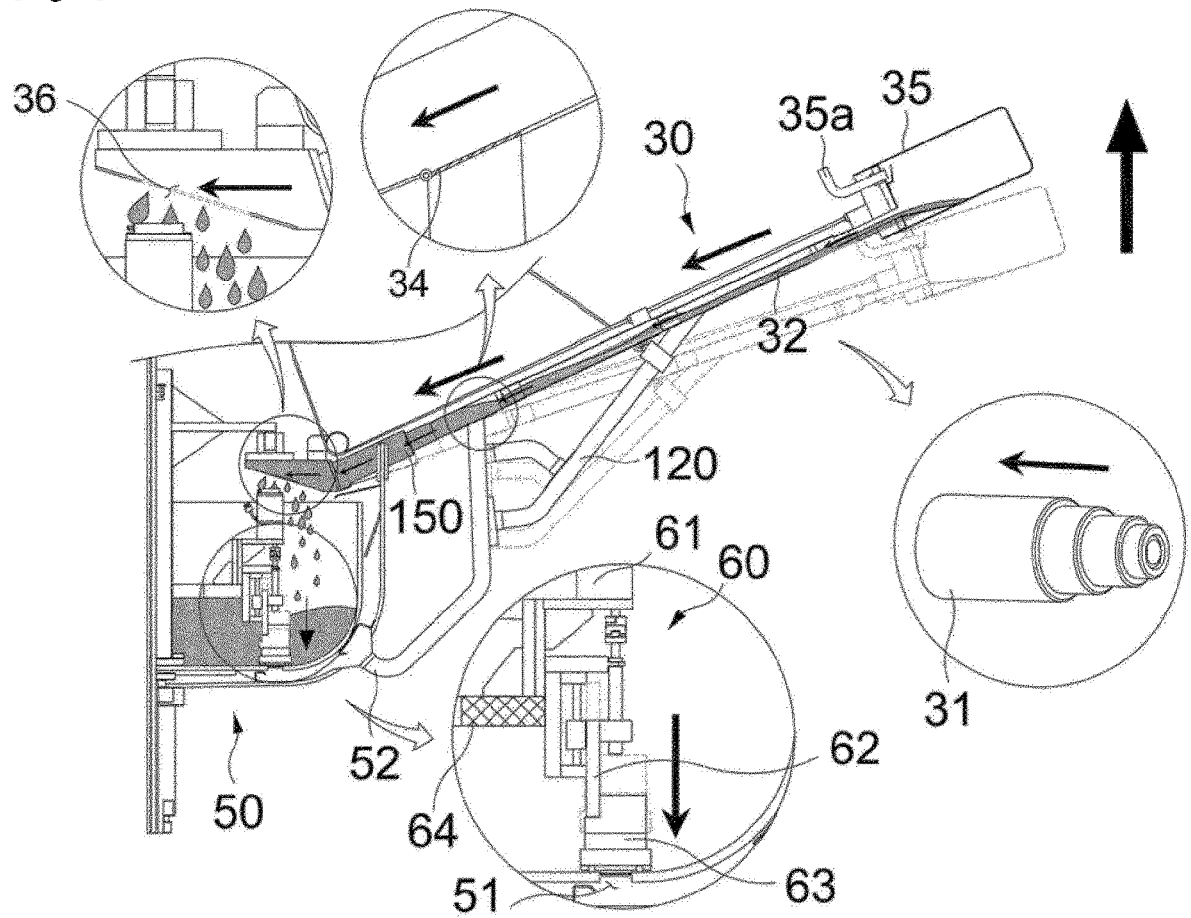

ROTATIONAL MOVEMENT ASSISTING DEVICE

BACKGROUND

The present invention relates to a rotational movement assisting device, and more particularly, to a rotational movement assisting device capable of assisting a rotational movement of a rotary shaft, in which a rotational blade coupled to an uppermost end of the rotary shaft is rotated using a wind force, a horizontal rotation unit coupled to the rotary shaft is rotated when the rotary shaft is rotated by wind power, and a horizontal rotation unit having a multistage expandable rod may be folded by a centrifugal force so as to ensure inertia according to the movement of a center of gravity of the horizontal rotation unit.

In general, as the demand of electric energy increases, power generation facilities have been expanded by using fossil fuels or nuclear reactors. However, environmental pollution or radioactive spills which have recently emerged due to the power generation facilities have caused many problems such as human damage and global warming. In this regard, the installation of power generation facilities using renewable energy is actively promoted, and wind power, solar power, and tidal power tend to be particularly highlighted, and for the purpose of generalization of eco-friendly renewable energy generation facilities, national support is being strengthened in the installation of the corresponding power generation facilities.

Among the renewable energy sources, wind power generation facilities are receiving a lot of attention. The wind power generation facilities may be installed on coasts or lakes, etc., so as to take advantage of sea and land winds caused by temperature differences between land and sea/lakes and have an advantage of providing constant wind power in all seasons. However, since the wind power and a wind speed are not uniformly provided due to various environmental factors, in order to assist a rotational force transmitted to a rotating motor which is one component of a wind power generator, a method of assisting the rotational force by using a variable pitch angle of a multistage gear, motor or blade, and the like have been proposed. In a folding screen device for accelerating a turbine rotation speed of a vertical wind power generator in Korean Patent Application No. 10-2015-0021333, there is proposed a folding screen device for accelerating a turbine rotation speed of a vertical wind power generator capable of improving power generation efficiency of the wind power generator by installing a separate folding screen device around a turbine of the vertical wind power generator to block any one direction of let and right of the turbine and increase a rotational force of the turbine in an unblocked direction, but there is a need to improve the efficiency of a rotational movement.

Therefore, the present invention is directed to provide a rotational movement assisting device capable of assisting a rotational movement of a rotary shaft, in which when a rotational blade is rotated by using wind power, a horizontal rotation unit coupled to be rotatable around the rotary shaft is expanded, and circulating water of a reservoir unit is introduced into the horizontal rotation unit to deflect a center of gravity to an outer angle of the horizontal rotation unit so as to ensure rotational inertia.

SUMMARY OF THE INVENTION

The present invention has been made in an effort to provide a rotational movement assisting device using wind power and a centrifugal force so as to assist a rotational force.

Further, the present invention has been made in an effort to provide a rotational movement assisting device in which at the time of rotation of a central shaft, a horizontal rotation unit may be expanded and circulating water may be introduced into the horizontal rotation unit.

Further, the present invention has been made in an effort to provide a rotational movement assisting device capable of reducing an expanded horizontal rotation unit by a centrifugal force when a rotational speed is decreased.

Technical Solution

In order to solve the problems, an aspect of the present invention provides a rotational movement assisting device comprising: a rotational blade provided on an uppermost end of a rotary shaft to be rotatable using wind power; a reservoir unit provided on a lower end of the rotational blade to be rotatable as the rotary shaft rotates; a horizontal rotation unit coupled to be communicable with the reservoir unit and expandable so that circulating water of the reservoir unit may be introduced thereinto; a base unit erectly coupled to rotate through the rotary shaft; and a power generator connected with the rotary shaft on an upper surface of the base unit, wherein the rotational movement assisting device rotates the rotary shaft using wind power and the rotational blade, expands the horizontal rotation unit by a centrifugal force at the time of the rotation of the rotary shaft, and introduces the circulating water of the reservoir unit into the horizontal rotation unit, so as to assist a rotational movement due to movement a center of gravity caused by the introduced circulating water.

Another aspect of the present invention provides a rotational movement assisting device, in which a spring driving unit is embedded in a base unit, an end of a spring of the spring driving unit is fixed to a fixing part of a case part, the other end thereof is fixed to a rotary shaft provided to be rotatable through the case part, a winding part is provided on an end of the rotary shaft protruding and exposed to the outside of the case part so that an end of a first cable wire is wound on the winding part and the other end of the first cable wire passes through a penetration fixing body embedded in a through-hole of the rotary shaft to be fastened and fixed to a lower surface of a fastening body located above the penetration fixing body, and an end of a second cable wire is fixed and coupled to an upper surface of the fastening body and the other end thereof passes through the through-hole of the rotary shaft to be connected with an outermost expandable rod of the horizontal rotation unit, wherein when a rotational force is decreased, the second cable wire may be pulled out due to a weight or a winding force of the spring, so that the expandable rod may be folded.

The present invention relates to a rotational movement assisting device having an advantage of assisting a rotational movement, in which a horizontal rotation unit having a plurality of expandable rods is expanded at the time of rotation of a rotary shaft, and circulating water is introduced into a horizontal rotation unit coupled to be communicable with a reservoir unit to deflect a center of gravity of the horizontal rotation unit to an outer angle due to fluidity and a centrifugal force of the circulating water at the time of rotation of the horizontal rotation unit, so as to ensure inertia of a rotational movement.

BRIEF DESCRIPTION OF DRAWINGS

FIG. 1 is an overall perspective view for a rotational movement assisting device.

FIG. 2 is an exploded perspective view for the rotational movement assisting device.

FIG. 3 is an exploded view for a rotational blade of the rotational movement assisting device.

FIG. 4 is an exemplary view of the rotational movement assisting device in which circulating water is supplied to a horizontal rotation unit.

FIG. 5 is a detailed cross-sectional view of the rotational movement assisting device in which circulating water is collected to a reservoir unit.

FIG. 6 is a detailed view of coupling of first and second cable wires of the rotational movement assisting device.

FIG. 7 is an exemplary view of the rotational movement assisting device in which circulating water is supplied to a horizontal rotation unit.

FIG. 8 is an exemplary view of the rotational movement assisting device in which the circulating water of the horizontal rotation unit is collected to a reservoir unit.

DETAILED DESCRIPTION OF THE INVENTION

Hereinafter, the present invention will be described in more detail with reference to the accompanying drawings.

Before this, terms and words used in this specification and claims should not be interpreted as being limited to typical or dictionary meanings, but should be interpreted as having meanings and concepts which comply with the technical spirit of the present invention, based on the principle that inventors can appropriately define the concept of the term to describe their own invention in the best manner.

Therefore, configurations illustrated in the drawings and exemplary embodiments disclosed in the present specification are only the most preferred exemplary embodiment of the present invention and do not represent all of the technical spirit of the present invention, and thus it is to be understood that various equivalents and modified examples, which may replace the configurations, are possible when filing the present application.

The present invention relates to a rotational movement assisting device comprising: a pipe-type rotary shaft 70 having a through-hole 71 formed therein; a rotational blade 10 coupled so as to rotate the rotary shaft 70 by using a rotation coupling unit 20 provided on an uppermost end of the rotary shaft 70; a base unit 80 erectly provided by using a rotation installation unit 85 such that the rotary shaft 70 is rotatable; a dual partition wall-type reservoir unit 50 provided at the rotary shaft 70 between the rotational blade 10 and the base unit 80 so as to be coupled to be rotatable; a multistage expandable horizontal rotation unit 30 communicating with the reservoir unit 50 such that circulating water 150 may be introduced thereinto and having an inner space part 32 formed therein; a power generator 90 provided on an upper surface of the base unit 80 and capable of generating power by using a rotational force of the rotary shaft 70 using a driving serration unit 72 and a rotating serration unit 92; and a spring driving unit 100 embedded in the base unit 80.

The pipe-type rotary shaft 70 is provided on an upper surface of the base unit 80 to be rotatable using a rotation installation unit 85.

The spring driving unit 100 is embedded in a base space part 92 formed in the base unit 80.

The rotational blade 10 is coupled to the rotation coupling unit 20 to rotate the rotary shaft 70 and the reservoir unit 50 coupled to the rotary shaft 70 using wind power, and the horizontal rotation unit 30 may rotate at the time of the rotation of the reservoir unit 50, at this time, the circulating water 150 of the reservoir unit 50 may be introduced into the inner space part 32 of the horizontal rotation unit 30.

More specifically, a central perforating part 81 is formed on an upper surface of the base unit 80, and the pipe-type rotary shaft 70 is erectly coupled to the rotation installation unit 85 around the central perforating part 81 and provided so that the through-hole 71 of the rotary shaft 70 may communicate with the base space part 82 of the base unit.

The rotational blade 10 comprises a central shaft 11 having a coupling groove 11a formed on a lower surface thereof and a plurality of blade parts 12 coupled to the central shaft 11.

The rotational blade 10 is coupled to an uppermost end of the pipe-type rotary shaft 70 using the rotation coupling unit 20.

The lower surface of the rotation coupling unit 20 is opened and comprises connecting parts 21 formed from both inner walls of the rotation coupling unit 20; an insertion cylindrical hole 22 coupled or formed between the both connecting parts 21 to be coupled with an uppermost end of the rotary shaft 70; and a protrusion coupling part 23 formed on the upper surface of the rotation coupling unit 20. The uppermost end of the rotary shaft 70 may be inserted into the insertion cylindrical hole 22 and the protrusion coupling part 23 may be inserted and coupled into the coupling groove 11a of the central shaft 11 of the rotational blade 10.

The reservoir unit 50 is coupled to the cylindrical installation unit 40 provided in the rotary shaft 70 to be rotatable at the same time of the rotation of the rotary shaft 70, manufactured by a double partition wall, and comprises a water feeding pipe 52 capable of communicating through the water feeding hole 51.

The horizontal rotation unit 30 comprises a multistage pipe-type expandable rod 31 having an inner space part 32 formed therein; a communicating hole 33 communicating with the water feeding pipe 52 so that the circulating water 150 of the reservoir unit 50 may be introduced into the inner space part 32 of the expandable rod 31 through the water feeding hole 51 and the water feeding pipe 52; a water collecting tank 35 coupled to an outermost expandable rod 31 of the horizontal rotation unit 30 and having an air port 35a; and a drain port 36 formed on an end of an innermost expandable rod.

The horizontal rotation unit 30 may be multiply coupled to the water feeding pipe 52 of the reservoir unit 50, a supporter 120 coupled to the water feeding pipe 52, and an installation reinforcing part 45 coupled to the installation unit 40.

A cover part 34 is provided with a hinge between the communicating hole 33 and the water feeding pipe 52 to be opened and closed so as to limit the circulating water 150 to be introduced thereinto.

The cover part 34 is embedded in the reservoir unit 50 and may rotate at the same time of the rotation of the rotary shaft 70 fixed and coupled to the installation unit 40. The water feeding unit 60 comprises a vertical rotating motor 61 provided so as to open and close the water feeding hole 51 for feeding to the horizontal rotation unit 30; a vertical movement rod 62 coupled with the vertical rotating motor 61; an opening/closing cover 63 coupled to an end of the vertical movement rod 62 to open and close the water feeding hole 51 of the reservoir unit 50; and a rotation speed sensor 64 sensing the rotation of the rotary shaft 70 to promote the opening and closing of the water feeding hole 51. When the rotary shaft 70 rotates, the reservoir unit 50 and the water feeding unit 60 coupled to the installation unit 40 integrally rotate. The rotation speed sensor 64 senses a rotational speed of the central shaft 11 to open or close the opening/closing cover 63 according to a predetermined value, and the vertical rotating motor 61 and the rotation speed sensor 64 are driven with powder and will be not illustrated separately for convenience of illustration.

In addition, the power generator 90 coupled to an upper surface of the base unit 80 comprises a rotational rod part 91 rotating by protruding from an outer wall of the power generator 90; and a rotating serration unit 92 coupled to the rotational rod part 91 and engages with the driving serration unit 72 coupled to the rotary shaft 70 so as to promote power generation using the rotational force of the rotary shaft 70.

The spring driving unit 100 embedded in the base unit 80 comprises a case part 101; a rotary shaft 102 protruding through a side of the case part 101 and provided to be rotatable; a spring 103 having an end fixed and coupled to the rotary shaft 102 to be wound; a fixing part 104 fixed and coupled to the other end of the spring 103; and a winding part 105 coupled to the rotary shaft 102 protruding from the outer wall of the case part 101.

The spring driving unit 100 further includes a penetration fixing body 110 embedded in the through-hole 71 of the rotary shaft 70; and a fastening body 111 provided on an upper end of the penetration fixing body 110.

The spring driving unit 100 comprises a first cable wire 109 having an end fixed and wound to the winding part 105 and the other end passing through penetration fixing body 110 to be fixed and coupled to a lower surface of the fastening body 111; and a second cable wire 112 coupled to an upper surface of the fastening body 111 and coupled to the expandable rod 31 or the water collecting tank 35 of each horizontal rotation unit 30 through the lower surface of the rotation coupling unit 20 by passing through the through-hole 71 of the rotary shaft 70.

Further, the spring driving unit 100 comprises a supporter 120 extended from the water feeding pipe 52 to support the expandable rod 31 in order to support weights of the circulating water 150 and the expandable rod 31, when the circulating water 150 is introduced into the inner space part 32 of the horizontal rotation unit 30.

As an exemplary embodiment, while the rotational blade 10 coupled to the rotary shaft 70 receives the wind power to rotate the rotary shaft 70, the horizontal rotation unit 30, the reservoir unit 50, and the water feeding unit 60 coupled to the installation unit 40 rotate. In addition, the driving serration unit 72 coupled to the lower end of the rotary shaft 70 transmits the rotational force of the rotary shaft 70 to the rotating serration unit 92 of the power generator 90 so as to promote the power generation.

As the rotary shaft 70 rotates, when the horizontal rotation unit 30 rotates to sense a predetermined rotational speed by the rotation speed sensor 64 of the water feeding unit 60 embedded in the reservoir unit 50, the vertical rotating motor 61 operates the vertical movement rod 62 to lift the opening/closing cover 63 that has sealed the water feeding hole 51. As a result, the circulating water 150 is introduced into the inner space part 32 of the horizontal rotation unit 30 through the water feeding pipe 52 and a communicating port, and the expandable rod 31 that has been folded during rotation is expanded as illustrated in FIG. 4 so that more circulating water 150 is introduced into the inner space part 32 of the expandable rod 31. That is, when the rotational speed is increased, the cover part 34 opened and closed using the hinge between the communicating hole 33 and the water feeding pipe 52 is opened by water pressure so as to promote the introduction of the circulating water. In addition, when the rotational speed is decreased, the cover part is sealed and the circulating water may be introduced back to the reservoir unit again through a drain port formed in the innermost expandable rod. At the time of the rotation of the horizontal rotation unit, the cover part may be opened by the water pressure when the circulating water is introduced through the water feeding pipe by a centrifugal force, and when the rotational speed of the horizontal rotation unit is decreased, the introduction water pressure of the circulating water by the centrifugal force is lowered so that the cover part may seal the communicating port.

The second cable wire 112 is connected to an end of the horizontal rotation unit 30, and the second cable wire 112 is fixed and coupled to the upper surface of the fastening body 111 embedded in the rotary shaft 70 through an opening in the lower surface of the rotation coupling unit 20 and the through-hole 71 of the rotary shaft 70 from the expandable rod 31 or the water collecting tank 35. On the lower surface of the fastening body 111, the first cable wire 109 is wound on the winding part 105 of the rotary shaft 102 of the spring driving unit 100, and as a result, when the expandable rod 31 is unfolded, as illustrated in FIG. 4, the first cable wire 109 is unwound from the winding part 105 and when the expandable rod 31 is folded, as illustrated in FIG. 5, the first cable wire 109 is wound. That is, as illustrated in FIG. 6, when the expandable rod 31 is unfolded, the first cable wire 109 that has been wound on the winding part 105 needs to be stretched and unfolded and has a tension to unwind and then wind the spring, and when the expandable rod 31 is folded, the first cable wire 109 needs to be wound so that the spring is wound.

The present invention may ensure inertia according to the movement of the center of gravity by rotating the rotary shaft 70 using the wind power and then expanding the horizontal rotation unit 30 using the centrifugal force.

Further, the rotational blade may be horizontally coupled to the rotary shaft as in the exemplary embodiment, or coupled in parallel to the rotary shaft using a bevel gear so as to transmit the rotational force by the wind power to the rotary shaft.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Therefore, the spirit of the present invention should not be defined only by the described exemplary embodiments, and it should be appreciated that claims to be described below and all which are equivalent to the claims or equivalently modified to the claims are included in the scope of the spirit of the present invention.

EXPLANATION OF REFERENCE NUMERALS AND SYMBOLS

10: Rotational blade
11: Central shaft
11a: Coupling groove
12: Blade part
20: Rotation coupling unit
21: Connecting part
22: Insertion cylindrical hole
23: Protrusion coupling part
30: Horizontal rotation unit
31: Expandable rod 32: Inner space part
33: Communicating hole
34: Cover part
35: Water collecting tank
35a: Air port
36: Drain port
40: Installation unit
45: Installation reinforcing part
50: Reservoir unit
51: Water feeding hole
52: Water feeding pipe
60: Water feeding unit
61: Vertical rotating motor
62: Vertical movement rod
63: Opening/closing cover
64: Rotation speed sensor
70: Rotary shaft
71: Through-hole
72: Driving serration unit
80: Base unit
81: Central perforating part
82: Base space part
85: Rotation installation unit
90: Power generator
91: Rotational rod part
92: Rotating serration unit
100: Spring driving unit
101: Case part
102: Rotary shaft
103 Spring
104 Fixing part
105: Winding part
109: First cable wire
110: Penetration fixing body
111: Fastening body
120: Supporter
150: Circulating water

The invention claimed is:
1. A rotational movement assisting device comprising:
a pipe-type rotary shaft having a through-hole formed therein;
a rotational blade coupled so as to rotate the rotary shaft by using a rotation coupling unit provided on an uppermost end of the rotary shaft;
a base unit erectly provided by using a rotation installation unit such that the rotary shaft is rotatable and having a central perforating part formed to communicate with the through-hole of the rotary shaft;
an installation unit provided between the rotational blade and the base unit to be rotatable together with the rotary shaft;
a dual partition wall-type reservoir unit provided at the installation unit between the rotational blade and the base unit so as to be coupled to be rotatable; and
a horizontal rotation unit communicating with the reservoir unit such that circulating water may be introduced thereinto and having a multistage expandable rod with an inner space part formed therein,
wherein the pipe-type rotary shaft is provided on an upper surface of the base unit to be rotatable using a rotation installation unit,
the rotational blade is coupled to the rotation coupling unit to rotate the rotary shaft and the reservoir unit coupled to the rotary shaft using wind power, and the horizontal rotation unit may rotate at the time of the rotation of the reservoir unit, wherein the circulating water of the reservoir unit is introduced into the inner space part of the horizontal rotation unit.
2. The rotational movement assisting device of claim 1, further comprising:
a spring driving unit embedded in the base unit,
wherein the spring driving unit comprises a case part; a rotary shaft protruding through a side of the case part and provided to be rotatable; a spring having an end fixed and coupled to the rotary shaft to be wound; a fixing part fixed and coupled to the other end of the spring; and a winding part coupled to the rotary shaft protruding from the outer wall of the case part,
further comprises a penetration fixing body embedded in the through-hole of the rotary shaft; and
a fastening body provided on an upper end of the penetration fixing body, and
the spring driving unit comprises a first cable wire having an end fixed and wound to the winding part and the other end fixed and coupled to a lower surface of the fastening body through the penetration fixing body; and
a second cable wire coupled to an upper surface of the fastening body and coupled to the expandable rod of each horizontal rotation unit through the lower surface of the rotation coupling unit by passing through the through-hole of the rotary shaft, wherein when the expandable rod is unfolded, the first cable wire that has been wound on the winding part is stretched and has a tension to unwind and then wind the spring, and when the expandable rod is folded, the first cable wire is wound so that the spring is wound.
3. The rotational movement assisting device of claim 2, further comprising:
a cover part opening and closing a communicating port.
4. The rotational movement assisting device of claim 1, further comprising:
a water feeding hole perforated in a lower surface of the reservoir unit;
a water feeding pipe having a communicating hole so as to communicate with the reservoir unit; and
a water feeding unit embedded in the reservoir unit and fixed and coupled to the installation unit to be rotatable at the same time of the rotation of the rotary shaft,
wherein the water feeding unit comprises a vertical rotating motor provided so as to open and close the water feeding hole for feeding to the horizontal rotation unit; an vertical movement rod coupled with the vertical rotating motor; an opening/closing cover coupled to an end of the vertical movement rod to open and close the water feeding hole of the reservoir unit; and a rotation speed sensor sensing the rotation of the rotary shaft to promote the opening and closing of the water feeding hole,
wherein when the rotary shaft rotates, the reservoir unit and the water feeding unit coupled to the installation unit integrally rotate and the rotation speed sensor senses a rotational speed of the central shaft to open or close the opening/closing cover according to a predetermined value, so that the circulating water is introduced into the horizontal rotation unit through the water feeding hole of the water feeding unit and the communicating hole of the horizontal rotation unit.
5. The rotational movement assisting device of claim 1, further comprising:
a power generator connected onto an upper surface of the base unit and having a rotational rod part and a rotating serration unit coupled to the rotational rod part; and
a driving serration unit coupled to a front shaft, wherein a rotational force of the rotary shaft is transmitted to the power generator to promote the power generation.

6. The rotational movement assisting device of claim 1, further comprising:
a water collecting tank communicating with the inner space part of the horizontal rotation unit and having an air port.

7. The rotational movement assisting device of claim 1, wherein the horizontal rotation unit further comprises a supporter coupled to the water feeding pipe of the reservoir unit.

8. The rotational movement assisting device of claim 1, wherein the horizontal rotation unit is supported by an installation reinforcing part coupled to the installation unit.

* * * * *